United States Patent
Yu et al.

(10) Patent No.: US 8,754,002 B2
(45) Date of Patent: Jun. 17, 2014

(54) METHOD OF FABRICATING MEDIUM-HIGH TEMPERATURE CO2 SORBENTS MADE OF ALKALI METAL PROMOTED CALCIUM ALUMINATE CARBONATES

(75) Inventors: Ching-Tsung Yu, Taoyuan County (TW); Chi-Hung Wang, Changhua County (TW); Yau-Pin Chyou, Taipei (TW)

(73) Assignee: Institute of Nuclear Energy Research, Atomic Energy Council, Lungtan, Taoyuan (TW)

( * ) Notice: Subject to any disclaimer, the term of this patent is extended or adjusted under 35 U.S.C. 154(b) by 591 days.

(21) Appl. No.: 13/179,699

(22) Filed: Jul. 11, 2011

(65) Prior Publication Data

US 2013/0015399 A1    Jan. 17, 2013

(51) Int. Cl.
*B01J 20/04* (2006.01)

(52) U.S. Cl.
USPC ........ 502/414; 252/184; 423/420.2; 423/429; 423/421

(58) Field of Classification Search
CPC ........ B01J 20/04; C01F 11/18; C01F 11/182; C01B 31/24; C01D 7/00; C01D 15/08
USPC ......... 502/414; 252/184; 423/420.2, 429, 421
See application file for complete search history.

(56) References Cited

U.S. PATENT DOCUMENTS

| | | | | |
|---|---|---|---|---|
| 2,284,827 | A * | 6/1942 | Frederick et al. | 210/723 |
| 2,859,100 | A * | 11/1958 | Seailles | 423/129 |
| 8,142,730 | B2 * | 3/2012 | Smid et al. | 422/216 |
| 8,163,249 | B2 * | 4/2012 | Chyou et al. | 422/171 |
| 8,168,156 | B2 * | 5/2012 | Yu et al. | 423/600 |
| 8,207,086 | B2 * | 6/2012 | Yu et al. | 502/401 |
| 2008/0179253 | A1 * | 7/2008 | Clark et al. | 210/660 |
| 2010/0216942 | A1 * | 8/2010 | Lohmeijer et al. | 524/588 |
| 2014/0072501 | A1 * | 3/2014 | Yu et al. | 423/420.2 |

OTHER PUBLICATIONS

Po-Hsueh Chang et al., "Ca-Rich Ca—Al—Oxide, High-Temperature-Stable Sorbents Prepared from Hydrotalcite Precursors: Synthesis, Characterization, and CO2 Capture Capacity", ChemSusChem 2011, 4, 1844-1851.*

Ching-Tsung Yu, "Development of a novel Ca/Al carbonates for medium-high temperature CO2 capture", Energy Procedia 4 (2011) 787-794.*

Ching-Tsung Yu et al., "Hydrothermal preparation of calcium-aluminum carbonate sorbent for high-temperature CO2 capture in fixed-bed reactor", Fuel 122 (2014) 179-185.*

* cited by examiner

*Primary Examiner* — Douglas McGinty
(74) *Attorney, Agent, or Firm* — Jackson IPG PLLC

(57) ABSTRACT

A dry material is synthesized by alkali metal (Li, Na and K) promoted calcium aluminate carbonates to obtain a $CO_2$ sorbent used at a temperature higher than 600 Celsius degrees (° C.). The key composition of the sorbents is 52~69% of CaO, which is beneficial to capture $CO_2$ at 400~800° C. A breakthrough result is achieved by using this sintering-resistant sorbent, which includes the features of 50% initial carbonation capacity and 20 folds $CO_2$ capturing performance maintained after 40~60 hours. Besides, alkali bearing material provides good velocity in $CO_2$ capturing/releasing cycles; for example, by using Li and K series sorbents, 40 hours is required for 40 cycles only.

4 Claims, 7 Drawing Sheets

| Sorbent | Li series | Na series | K series |
|---|---|---|---|
| Granular size (μm) | 43 | 10 | 41 |
| Surface area (m²/g) | 14.5 | 17.3 | 14.2 |
| Pore size (cm³/g) | 0.02 | 0.02 | 0.02 |
| Pore diameter (nm) | 5.3~20.5 | | |
| Main components (N=3, wt%) | | | |
| Ca | 37.0 | 49.2 | 40.3 |
| CaO | 51.9 | 68.9 | 56.5 |
| Al | 2.2 | 3.5 | 1.0 |
| Li | 0.02 | ... | ... |
| Na | ... | 0.8 | ... |
| K | ... | ... | 0.04 |

FIG.6

| Sorbent | Li series | Na series | K series | CaO | Limestone | Li4SiO4 (Powder) | Li4SiO4 (Granule) |
|---|---|---|---|---|---|---|---|
| Weight (mg) | 6.0 | 17.5 | 5.2 | 11.5 | 8.4 | 13.5 | 33.3 |
| Time for single cycle (hour) | 1.0 | 1.5 | 1.0 | 1.5 | 1.5 | 1.3 | 1.5 |
| Cycle number | 40 | 40 | 40 | 40 | 40 | 40 | 40 |
| Amount ratio of $CO_2$ captured | 54~51 | 53~49 | 53~49 | 67~54 | 44~36 | 32~30 | 32~22 |
| Total time (hour) | 40 | 60 | 40 | 60 | 60 | 53.3 | 60 |
| Total amount of $CO_2$ captured (mg) | 125 | 353 | 107 | 279 | 131 | 164 | 357 |
| $R_{40}$ (%) | 94 | 93 | 93 | 81 | 82 | 94 | 69 |
| Characteristic 1 (mg $CO_2$/mg sorbent) | 20.8 | 20.2 | 20.6 | 24.3 | 15.6 | 12.1 | 10.7 |
| Characteristic 2 (mg $CO_2$/mg sorbent·h) | 0.52 | 0.34 | 0.51 | 0.40 | 0.26 | 0.23 | 0.18 |

METHOD OF FABRICATING MEDIUM-HIGH TEMPERATURE CO2 SORBENTS MADE OF ALKALI METAL PROMOTED CALCIUM ALUMINATE CARBONATES

TECHNICAL FIELD OF THE DISCLOSURE

The present disclosure relates to fabricating $CO_2$ sorbents; more particularly, relates to fabricating $CO_2$ sorbents with calcium aluminate carbonates promoted with alkali metals for capturing $CO_2$ at a medium-high temperature.

DESCRIPTION OF THE RELATED ARTS

The most effective way for reducing $CO_2$ is to capture $CO_2$ from a steady and enormous emission source, like coal power plant, petrochemical plant, cement plant, steel plant, etc. Two ways are used for capturing $CO_2$: one is a wet way and the other is a dry way. The wet way is usually called post-combustion, using a material like monoethanolamine (MEA), methylethanolamine (MDEA), diethonalamine (DEA), Tri-ethonalamine (TEA), alkali solution, etc. to be used at a temperature between 100° C. and 150° C. The dry way has the follow categories: When being used at a temperature between room temperature and 400° C., sorbents for post-combustion capture are usually used, like carbon-based sorbents, supported-amine sorbents, zeolite sorbents, etc; and, when used at a temperature between 400° C. and 800° C., sorbents for pre-combustion and post-combustion capture are used, like $CaO/CaCO_3$, $Li_4SiO_4$, $Li_2ZrO_3$, etc.

The dry way can be used at a higher temperature, like more than 600° C.; and CaO is the most used. For sorbents used in the higher temperature, main concerns include reducing deterioration, improving capture capacity, etc. Yet, the key concern for the sorbents is stability.

Stability is directly related to capture capacity. It is because carbonation of CaO happened on capturing $CO_2$ will produce $CaCO_3$, which may likely be sintered. Hence, to shorten the process time for capturing $CO_2$ becomes the main concern. Under an environment having a steady temperature and a steady pressure, $CO_2$ capture is related to the following factors: inverse to ion size, diffusion coefficient and direct to square root of reaction time. On capturing $CO_2$ at a medium-high temperature, the outermost layer of ions of the sorbents will diffuse very fast and thus enhance reactions of capturing/releasing $CO_2$, $Li_2CO_3$, $Na_2CO_3$ and $K_2CO_3$ are not fit to be directly used for capturing $CO_2$ owing to their small capture amount ratios (<10 wt %) and their low decomposition temperatures (e.g. smaller than 400° C. for $K_2CO_3$). They may be fit to be used as promoters for making compound materials of medium-high $CO_2$ sorbents, like $Li_4SiO_4$ and $Li_2ZrO_3$; $NaOH/CaO$ and $Na_2ZrO_3$; and $K_2CO_3/Al_2O_3$ (or $K_2CO_3/CaO$) and $K_2Ti_2O_5$. Yet, sorbents directly promoted with alkali metals to be used for $CO_2$ capture at a temperature higher than 600° C. are still not found. Hence, the prior arts do not fulfill all users' requests on actual use.

SUMMARY OF THE DISCLOSURE

The main purpose of the present disclosure is to fabricating $CO_2$ sorbents with calcium aluminate carbonates promoted with alkali metal, like Li, Na, K, etc., for capturing $CO_2$ at a medium-high temperature of 400~800° C. with a fast capture velocity, a good stability and a high amount ratio of $CO_2$ captured.

To achieve the above purpose, the present disclosure is a method of fabricating medium-high temperature $CO_2$ sorbents made of alkali metal promoted calcium aluminate carbonates, comprising step of: (a) mixing a source of Ca ions and $Al(NO_3)_3.9H_2O$ to obtain an acid solution, where the source of calcium ions is $CaCl_2$, $Ca(NO_3)_2$ or $Ca(CH_3COO)_2.xH_2O$ and x is a value between 0 and 1; and where a mole ratio of the source of calcium ions to $Al(NO_3)_3.9H_2O$ is between 1:1 and 30:1 in the acid solution; (b) mixing NaOH and a carbonate to obtain an alkali solution, where the alkali solution has 1.6 mole of NaOH; and where the carbonate is $Li_2CO_3$, $Na_2CO_3$ or $K_2CO_3$; (c) mixing the acid solution and the alkali solution to obtain a mixed solution and staying still the mixed solution; and (d) after staying still the mixed solution, filtering the mixed solution to remove impurities and drying mixed solution to be sintered in an oven to obtain a $CO_2$ sorbent, wherein, according to the carbonate used in step (b), the $CO_2$ sorbent thus obtained is Li—Ca—Al—$CO_3$, Na—Ca—Al—$CO_3$ or K—Ca—Al—$CO_3$. Accordingly, a novel method of fabricating medium-high temperature $CO_2$ sorbents made of alkali metal promoted calcium aluminate carbonates is obtained.

BRIEF DESCRIPTIONS OF THE DRAWINGS

The present disclosure will be better understood from the following detailed description of the preferred embodiment according to the present disclosure, taken in conjunction with the accompanying drawings, in which FIG. 1 is the flow view showing the preferred embodiment according to the present disclosure;

FIG. 6 is the view showing the characteristics of the different $CO_2$ sorbents; and FIG. 7 is the view showing the stabilities and the characteristics of the different $CO_2$ sorbents after 40 cycles of capturing/releasing $CO_2$.

DESCRIPTION OF THE PREFERRED EMBODIMENT

The following description of the preferred embodiment is provided to understand the features and the structures of the present disclosure.

Figure 1:
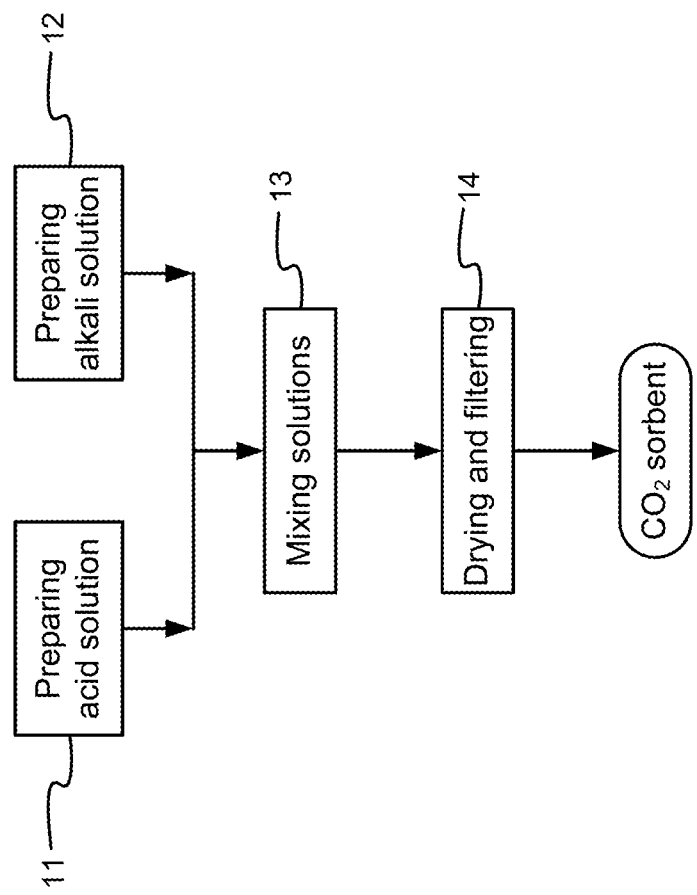

Please refer to FIG. 1, which is a flow view showing a preferred embodiment according to the present disclosure. As shown in the figure, the present disclosure is a method of fabricating medium-high temperature $CO_2$ sorbents made of alkali metal promoted calcium aluminate carbonates, where an alkaline oxide and $Al_2O_3$ are used as main components to be bond with a carbonate having ions of an alkali element, like lithium (Li), sodium (Na) or potassium (K), for a co-precipitation reaction to form a medium-high temperature $CO_2$ sorbent through sintering; and where, in a medium-high temperature gas flow, $CO_2$ is captured by the sorbents in fast reaction velocities with stable capture ratios and amounts. The present disclosure comprises the following steps:

(a) Preparing acid solution 11: A source of calcium (Ca) ions and $Al(NO_3)_3.9H_2O$ are mixed to obtain an acid solution, where the source of calcium ions is $CaCl_2$, $Ca(NO_3)_2$ or $Ca(CH_3COO)_2.xH_2O$ and x is a value between 0 and 1; and where a mole ratio of the Ca ions source to the Al(NO₃)₃.9H₂O is between 1:1 and 30:1 in the acid solution.

(b) Preparing alkali solution 12: NaOH and a carbonate are mixed to obtain an alkali solution, where the alkali solution has 1.6 mole of NaOH; and where the carbonate is $Li_2CO_3$, $Na_2CO_3$ or $K_2CO_3$.

(c) Mixing solutions 13: The acid solution and the alkali solution are mixed by stirring for 24 to 36 minutes to obtain a mixed solution; and, then, the mixed solution is stayed still for 24 hours (hrs).

(d) Drying and filtering 14: After the mixed solution is stayed still, the mixed solution is filtered to remove impurities and is dried to be sintered in an oven at 600 Celsius degrees (° C.) for obtaining a $CO_2$ sorbent, where, according to the carbonate used in step (b), the $CO_2$ sorbent thus obtained is Li—Ca—Al—$CO_3$, Na—Ca—Al—$CO_3$ or K—Ca—Al—$CO_3$.

If $Li_2CO_3$ is used in step (b) to be mixed with 1.6 mole of NaOH, a $CO_2$ sorbent of Li—Ca—Al—$CO_3$ is obtained in step (d); if $Na_2CO_3$ is used, Na—Ca—Al—$CO_3$ is obtained; and, if $K_2CO_3$ is used, K—Ca—Al—$CO_3$ is obtained.

On using the present disclosure, the $CO_2$ sorbent of Li—Ca—Al—$CO_3$, Na—Ca—Al—$CO_3$ or K—Ca—Al—$CO_3$ captures $CO_2$ at a temperature between 400° C. and 800° C. After absorbing $CO_2$ to obtain $CaCO_3$, $CO_2$ density can be reduced by heating to recycle $CaCO_3$ into CaO for regaining capture activity. Such a cycle is expressed with the following two chemical formulas:

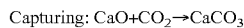

Capturing: $CaO+CO_2 \rightarrow CaCO_3$

Releasing: $CaCO_3 \rightarrow CaO+CO_2$

Figure 2:
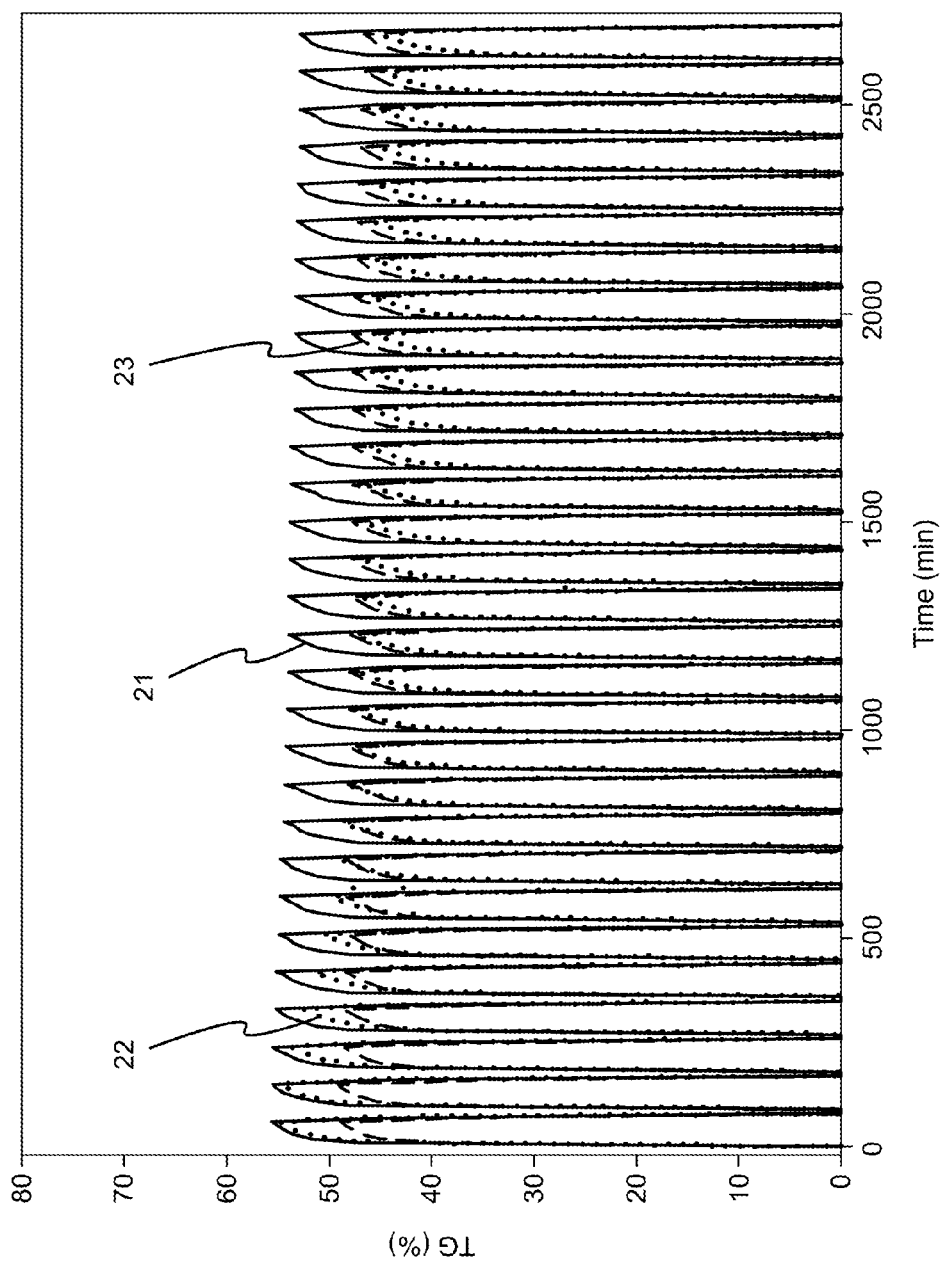
FIG. 2 is the view showing the TG curves for the preferred embodiment at different temperatures.

Please refer to FIG. 2 and FIG. 6, which are a view showing TG curves for a preferred embodiment at different temperatures; and a view showing characteristics of different $CO_2$ sorbents. As shown in the figures, each single cycle processed by $CO_2$ sorbents fabricated according to the present disclosure includes steps of capturing and releasing $CO_2$. The ratio of $CO_2$ captured during a few cycles of capturing/releasing $CO_2$ shows stability of the $CO_2$ sorbents. At 750° C., thermogravimetric (TG) analyses are processed for 30 cycles of capturing/releasing $CO_2$. Curves 21,22,23 in FIG. 2 show initial amount ratios of 56%, 55% and 49%. The amount ratios remain 53%, 45% and 47% after 30 cycles of capturing/releasing $CO_2$, which show stability of the $CO_2$ sorbents.

When the ratio of Ca to Al is bigger than 7, complex crystalline phase may be produced with high cost and quality may become hard to control. Hence, in FIG. 6, an acetic acid is used to fabricate the $CO_2$ sorbents having a ratio of Ca to Al as 7 for measuring their characteristics, including surface areas, pore characteristics and other chemical characteristics. The CaO wt % is figured out by a factor of CaO/Ca, i.e. CaO=Ca×1.4. Therein, the average granular size is 10~43 μm; the surface area is 14.2~17.3 m²/g; the pore size is 0.02 cc/g, which is a micropore or a mesopore; and, the average pore diameter is 5.3~20.5 nm.

The CaO contents in the $CO_2$ sorbents have great impacts on $CO_2$ capture capacity. The $CO_2$ sorbents are dissolved in acid solutions for measuring elements of Ca, Al, etc. with inductively coupled plasma (ICP) for figuring out CaO contents. For Li, Na and K series $CO_2$ sorbents, the CaO contents are 51.9%, 68.9% and 56.5%, respectively. Therein, the ratios of Li, Na and K contained are 0.02% for Li series, 0.8% for Na series and 0.04% for K series.

Figure 3:
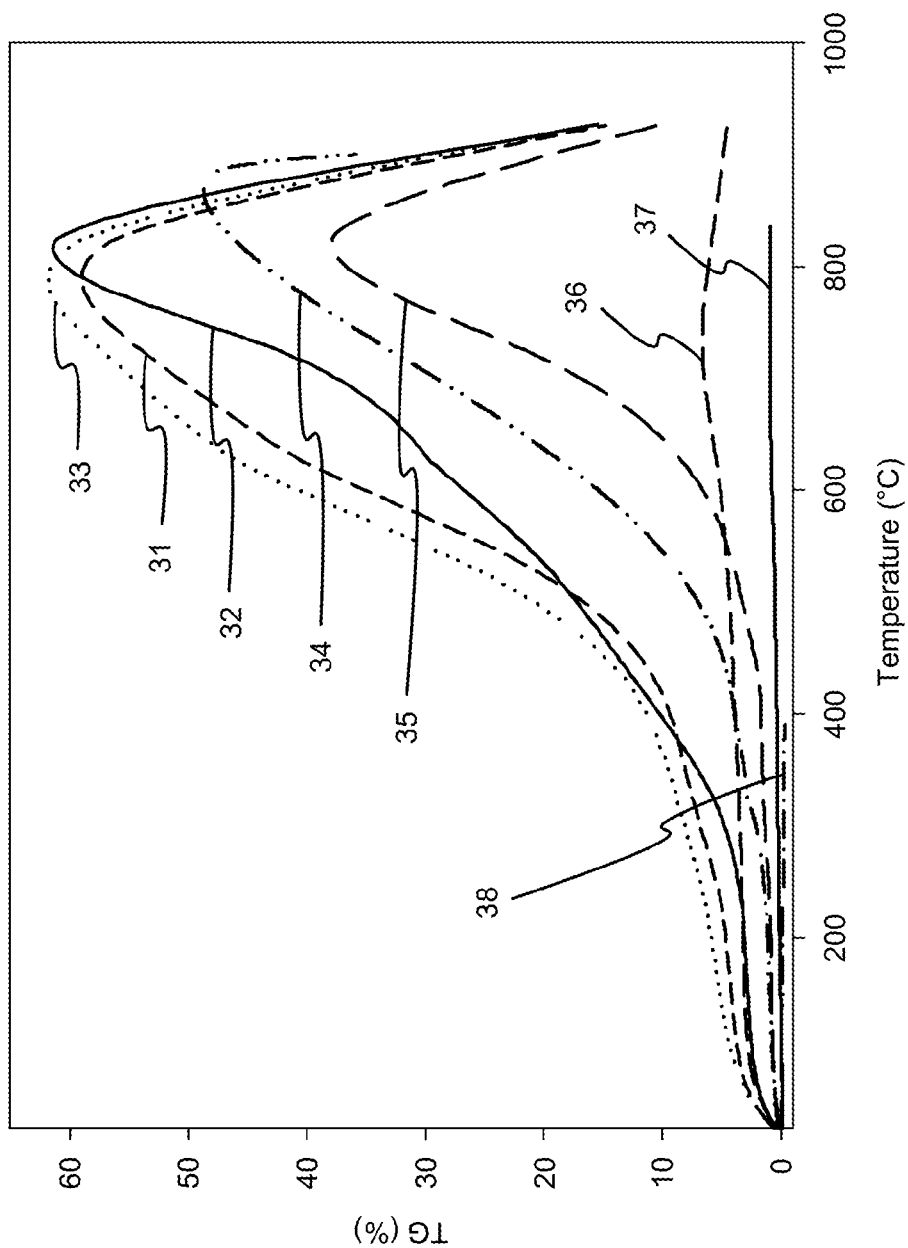
FIG. 3 is the view showing the TG curves of the different $CO_2$ sorbents.

Please refer to FIG. 3, which is a view showing TG curves of different $CO_2$ sorbents. As shown in the figure, $CO_2$ sorbents fabricated according to the present disclosure, which contains Li, Na and K ions, are used to capture $CO_2$ from a room temperature to 950° C. for obtaining TG curves. As shown in TG curves 31,32,33 for the $CO_2$ sorbents fabricated according to the present disclosure, $CO_2$ is captured at a temperature between 400° C. and 800° C. with initial capture amount ratios higher than 50 wt %, whose performances are obviously better than traditional sorbents of CaO and $CaCO_3$ as shown in other TG curves 34,35. Besides, some more sorbents of $Li_2CO_3$, $Na_2CO_3$ and $K_2CO_3$ have initial capture amount ratios lower than 10 wt %. Hence, the $CO_2$ sorbents fabricated according to the present disclosure are better than other sorbents of CaO, $CaCO_3$, $Li_2CO_3$, $Na_2CO_3$ and $K_2CO_3$. Moreover, the Li series or K series sorbents fabricated according to the present disclosure have higher $CO_2$ capture velocity (slope) than the Na series sorbent at a temperature higher than 600° C., not to mention the other sorbents.

Figure 4:
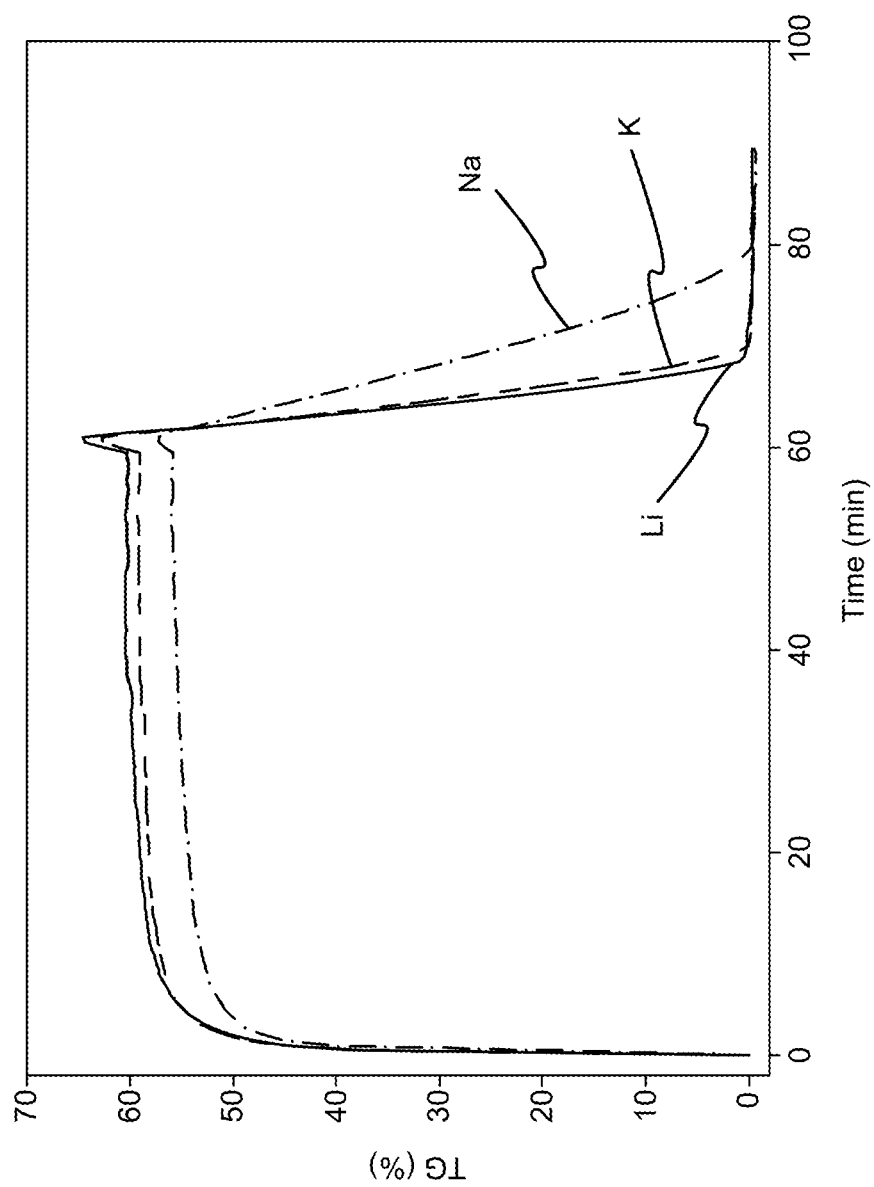
FIG. 4 is the view showing the TG curves in one cycle.

Please refer to FIG. 4, which is a view showing TG curves in one cycle. As shown in the figure, Li series, Na series and K series $CO_2$ sorbents fabricated according to the present disclosure are used to process a single cycle of capturing/releasing $CO_2$ at 750° C. As results show, capture rates of the sorbents do not have big different in between. But, the Li series and K series sorbents have better performance on releasing $CO_2$. The capture rates of the sorbents in a single cycle are 1.0 hour (hr) for Li series sorbent, 1.5 hrs for Na series sorbent and 1.0 hr for K series sorbent.

Figure 5:
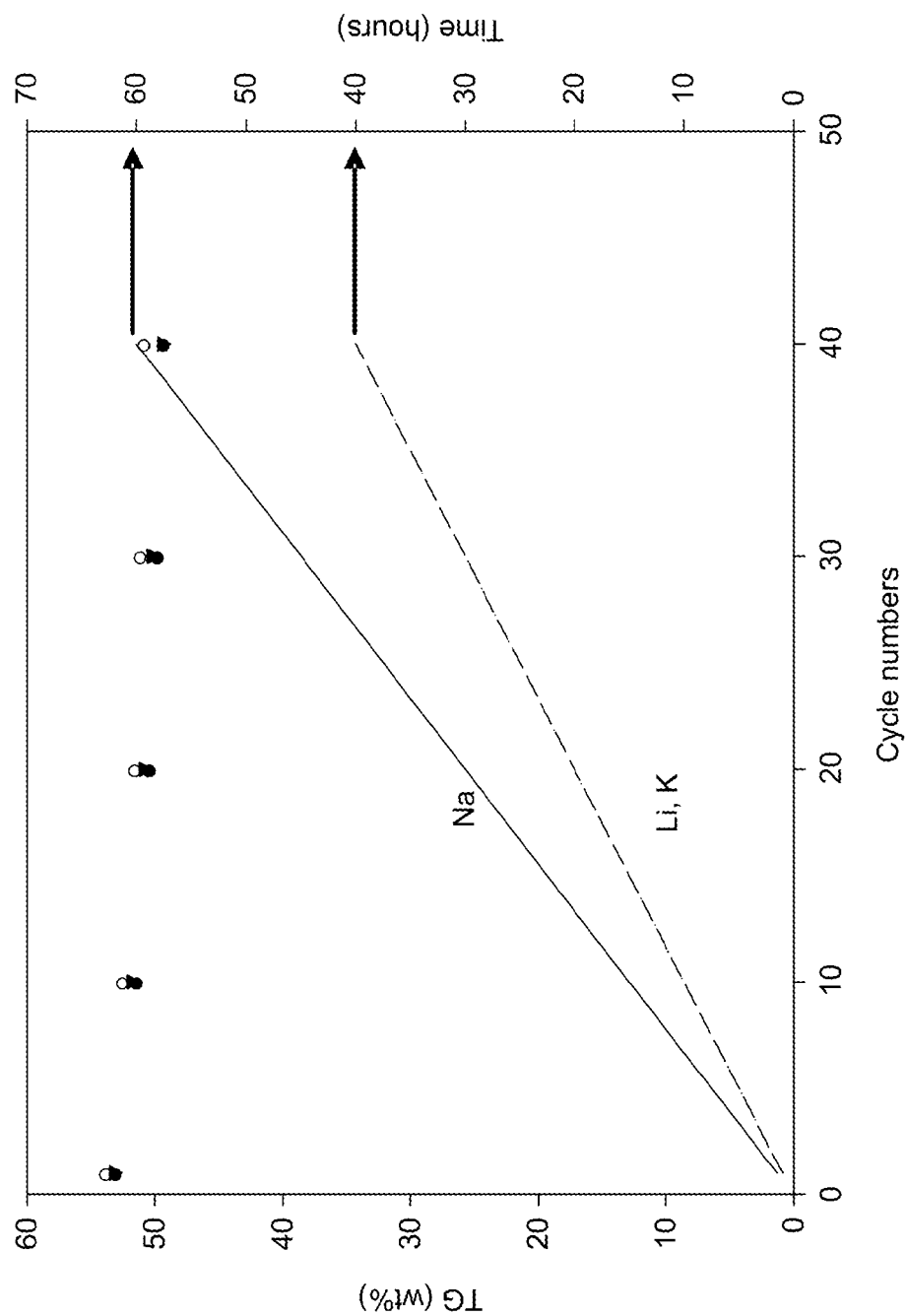
FIG. 5 is the view showing the time periods spent for 40 cycles of capturing/releasing $CO_2$ and the amounts of $CO_2$ captured in the 40 cycles.

Please refer to FIG. 5, which is a view showing time periods spent for 40 cycles of capturing/releasing $CO_2$ and amounts of $CO_2$ captured in the 40 cycles. As shown in the figure, 40 cycles of capturing/releasing $CO_2$ are processed to sorbents fabricated according to the present disclosure for acquiring best reaction times for capturing the most $CO_2$. As referring to FIG. 4, 40 cycles for the sorbents are 1.0 hr for Li series sorbent, 1.5 hrs for Na series sorbent and 1.0 hr for K series sorbent. The amount ratios of $CO_2$ captured are 54~51 wt % for Li series sorbent, 53~49 wt % for Na series sorbent and 53~49 wt % for K series sorbent. Conclusively, regarding capture amount, Li series sorbent has the best performance, followed by Na series sorbent and K series sorbent; regarding reaction time, Li series sorbent has the best performance; and, in the end, the Li series sorbent fabricated according to the present disclosure is the best sorbent.

Please refer to FIG. 7, which is a view showing stabilities and characteristics of different $CO_2$ sorbents after 40 cycles of capturing/releasing $CO_2$. as shown in the figure, $CO_2$ sorbents fabricated according to the present disclosure and traditional sorbents of CaO, limestone and $Li_4SiO_4$ are used to obtain their stabilities and characteristics after 40 cycles of capturing/releasing $CO_2$, where $CO_2$ is captured in an environment having a 100% $CO_2$ concentration and a temperature of 650~750° C.; and where $CO_2$ is released in an environment having a 100% $N_2$ density ratio and a temperature of 650750° C. A result is as follows:

(1) A single cycle of capturing/releasing $CO_2$ spends 1.0~1.5 hrs and, so, 40 cycles spend 40~60 hrs, where the time for the cycle includes time for capturing $CO_2$ and time for releasing $CO_2$ in the cycle.

(2) Stable amount ratios of $CO_2$ captured (g$CO_2$/g sorbent) for 1~40 cycles are 49~54 wt % for the sorbent fabricated according to the present disclosure; 67~54 wt % for CaO; 44~36 wt % for limestone; and 22~32 wt % for $Li_4SiO_4$, where each of the ratios is a ratio of increased weight after capturing $CO_2$ in current cycle to original weight after releasing $CO_2$ in previous cycle.

(3) The sorbents fabricated according to the present disclosure have high R40 values bigger than 94%, which reach the highest international standard (85~90%) and are almost equal to Li$_4$SiO$_4$'s performance (R40=94%). In addition, after 40~60 hrs of using, the sorbents still have stable performances obviously higher than CaO, limestone and Li$_4$SiO$_4$. Therein, R40 is the amount of CO$_2$ captured after 40 cycles of capturing/releasing CO$_2$.

(4) After 40 cycles of capturing/releasing CO$_2$, the weights of CO$_2$ captured by the sorbents fabricated according to the present disclosure is 20 times to the original weights of the sorbents used.

(5) Total amount of CO$_2$ captured is related to the sorbent used and the time spent for capturing/releasing CO$_2$. This characteristic is expressed with a unit of mgCO$_2$/mg sorbent.h, where the sorbents fabricated according to the present disclosure have a value of 0.52 and is better than the other values, like 0.34.

Hence, the present disclosure fabricates medium-high temperature CO$_2$ sorbents with calcium aluminate carbonate promoted with alkali metal, where the sorbents contains 52~69% of CaO to capture CO$_2$ at a temperature of 400~800° C. with initial capture ratios higher than 50 wt %. Furthermore, the sorbents combine CaO and Al$_2$O$_3$ to maintain good performances for 40 to 60 hrs with weights of CO$_2$ captured 20 times to original weights of the sorbents, where the Na series sorbent spends 50 hrs for 40 cycles of capturing/releasing CO$_2$ and the Li and K series sorbents spend 40 hrs for 40 cycles only.

To sum up, the present disclosure is a method of fabricating medium-high temperature CO$_2$ sorbents made of alkali metal promoted calcium aluminate carbonates, where calcium aluminate carbonates promoted with alkali metals are fabricated into CO$_2$ sorbents having capture ratios higher than 50 wt % during a time period more than 40 hrs and having fast capture velocities for spending just 40 hrs for 40 cycles of capturing/releasing CO$_2$.

The preferred embodiment herein disclosed is not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. A method of fabricating medium-high temperature CO$_2$ sorbents made of alkali metal promoted calcium aluminate carbonates, comprising steps of:
   (a) mixing a source of Ca ions and Al(NO$_3$)$_3$.9H$_2$O to obtain an acid solution,
      wherein said source of calcium ions is selected from a group consisting of CaCl$_2$, Ca(NO$_3$)$_2$ and Ca(CH$_3$COO)$_2$.xH$_2$O and x is a value between 0 and 1; and
      wherein a mole ratio of said source of calcium ions to said Al(NO$_3$)$_3$.9H$_2$O is between 1:1 and 30:1 in said acid solution;
   (b) mixing NaOH and a carbonate to obtain an alkali solution,
      wherein said alkali solution has 1.6 mole of NaOH; and
      wherein said carbonate is selected from a group consisting of Li$_2$CO$_3$, Na$_2$CO$_3$ and K$_2$CO$_3$;
   (c) mixing said acid solution and said alkali solution to obtain a mixed solution and staying still said mixed solution; and
   (d) after staying still said mixed solution, filtering said mixed solution to remove impurities and drying said mixed solution to be sintered in an oven to obtain a CO$_2$ sorbent,
      wherein, according to said carbonate used in step (b), said CO$_2$ sorbent thus obtained is selected from a group consisting of Li—Ca—Al—CO$_3$, Na—Ca—Al—CO$_3$ and K—Ca—Al—CO$_3$.

2. The method according to claim 1,
   wherein said CO$_2$ sorbent captures CO$_2$ at a temperature between 400° C. and 800° C.;
   wherein said CO$_2$ sorbent has an initial CO$_2$ capture ratio bigger than 50 wt %; and
   wherein said CO$_2$ sorbent captures CO$_2$ for a time period between 40 hours (hrs) and 60 hrs.

3. The method according to claim 1,
   wherein Li—Ca—Al—CO$_3$ spends 40 hrs to process 40 cycles of CO$_2$ capture with a capture ratio higher than 51 wt %;
   wherein Na—Ca—Al—CO$_3$ spends 60 hrs to process 40 cycles of CO$_2$ capture with a capture ratio higher than 49 wt %; and
   wherein K—Ca—Al—CO$_3$ spends 40 hrs to process 40 cycles of CO$_2$ capture with a capture ratio higher than 49 wt %.

4. The method according to claim 1,
   wherein said CO$_2$ sorbent has an average amount ratio of CaO between 52% and 69%.

* * * * *